J. E. GAVIN.
EGG BOX.
APPLICATION FILED JAN. 12, 1915.

1,180,136.

Patented Apr. 18, 1916.
2 SHEETS—SHEET 1.

Witnesses

Inventor
J. E. Gavin.

By

Attorney

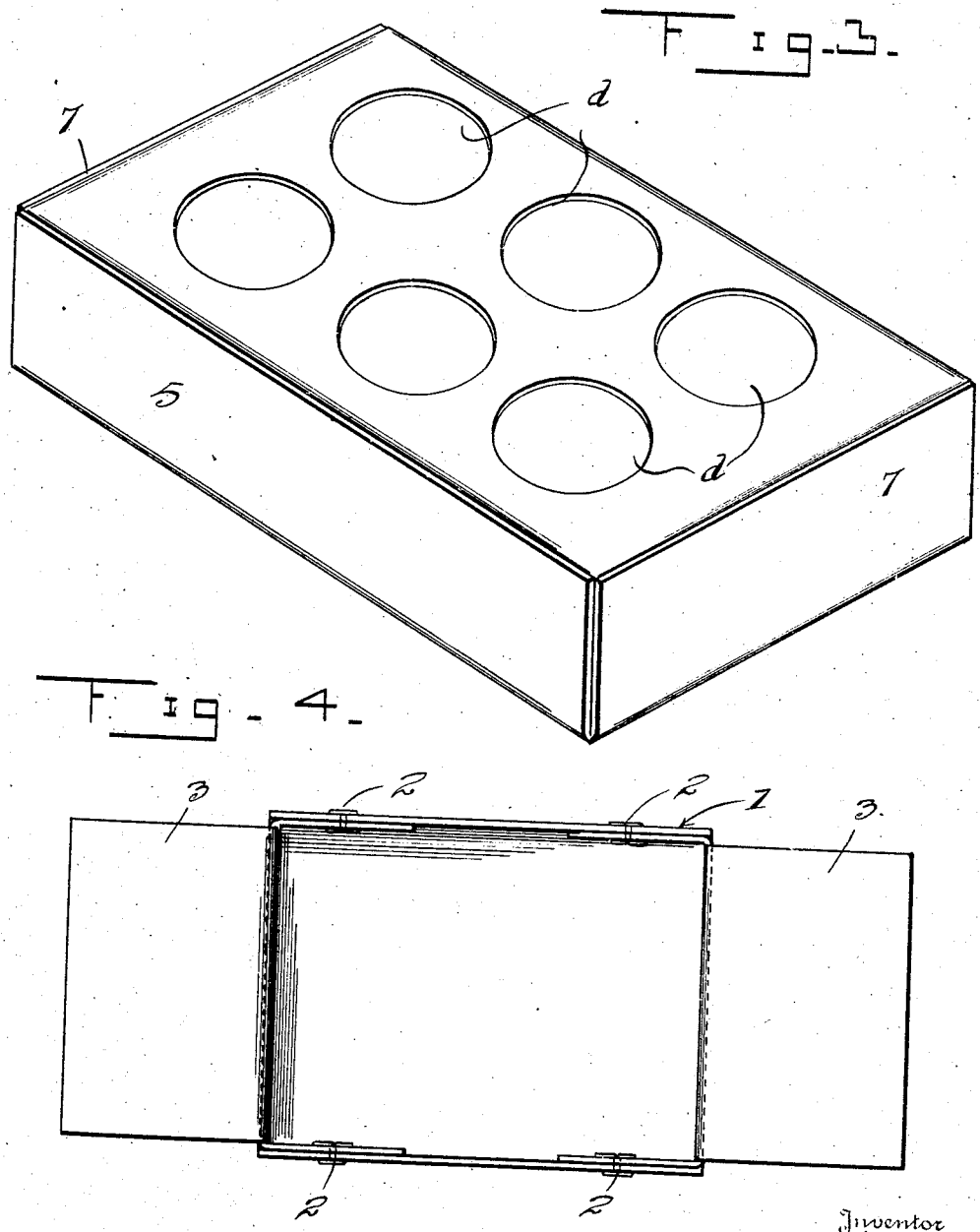

UNITED STATES PATENT OFFICE.

JOHN EDWARD GAVIN, OF BUFFALO, NEW YORK.

EGG-BOX.

1,180,136.  Specification of Letters Patent.  Patented Apr. 18, 1916.

Application filed January 12, 1915. Serial No. 1,849.

*To all whom it may concern:*

Be it known that I, JOHN EDWARD GAVIN, a citizen of the United States, residing at Buffalo, in the county of Erie and State of New York, have invented certain new and useful Improvements in Egg-Boxes; and I do hereby declare the following to be a full, clear, and exact description of the invention, such as will enable others skilled in the art to which it appertains to make and use the same.

This invention relates to egg boxes and one of the principal objects of the invention is to provide simple means for shipping eggs and to provide means whereby the eggs may be easily packed in cases to be safely shipped, and which will provide complete ventilation of the egg shells and will permit the eggs to be easily removed from the case singly, without removing the egg boxes.

The foregoing and other objects may be attained by means of the construction illustrated in the accompanying drawings, in which—

Figure 1:
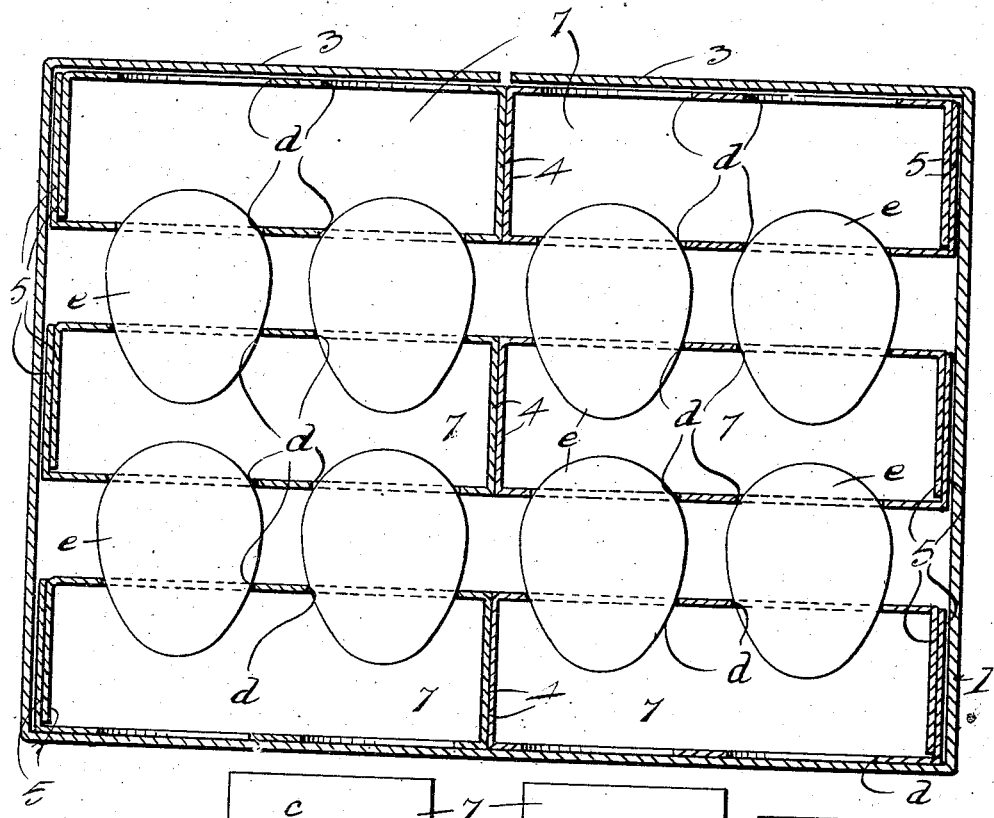
Figure 2:
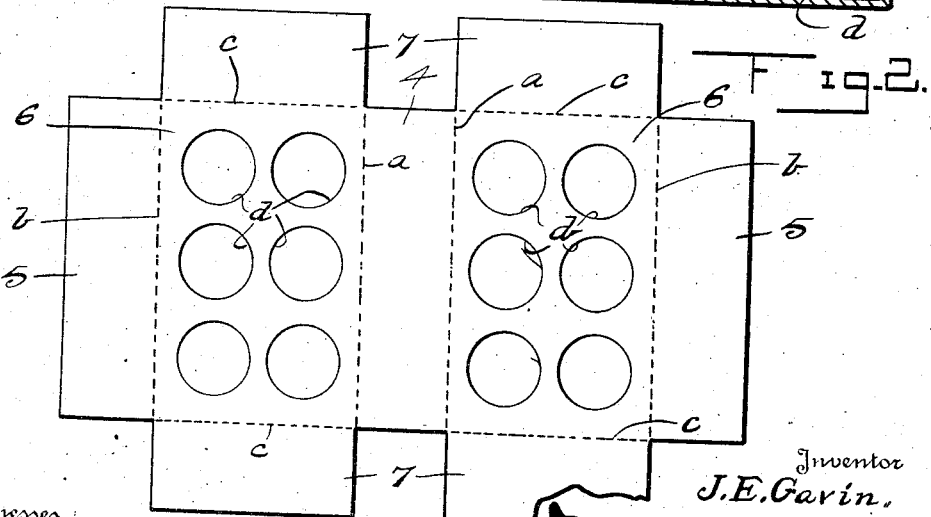

Figure 1 is a sectional view taken through an egg case and showing a number of egg boxes and eggs in the case, Fig. 2 is a top plan view of the blank for making the egg box, Fig. 3 is a perspective view of the egg box folded in complete condition, Fig. 4 is a top plan view of the egg case opened out for the reception eggs.

Referring to the drawings, the numeral 1 designates as an entirety an egg case, preferably made from a single piece of paper stock or corrugated paper board folded into form of a case of the required size to carry a certain number of egg boxes, said case having end flaps secured by fastener 2 to the sides of the box and the ends of the box having extensions 3 which form covers when folded inwardly.

The egg boxes are formed from a single blank of paper or paper stock board and comprise the back 4, the front flaps 5, the top and bottom members 6 and the end flaps 7. The box is folded on the lines $a$ and the flaps 5 are folded on the line $b$. The end flaps 7 are then folded on the dotted lines $c$, thus bringing the egg apertures $d$ into alinement in the top and bottom of the box.

In packing the eggs in the case 1, two egg boxes may be placed at the bottom of the box and then the eggs $e$ are placed in the openings $d$ in the lower boxes, after which another box is placed on top of the eggs, as shown in Fig. 1 of the drawings, and so on until the case is filled and the covers 3 are folded over on the top of the upper layer of boxes.

From the foregoing it will be obvious that in order to remove the eggs from the case, the upper boxes are removed, then the eggs may be removed singly. In packing the eggs in the cases, the lower boxes are first placed in the case and the eggs are then placed in the apertures $d$ and the upper boxes then placed in position, and so on until the case is filled.

Various changes may be made in the details of construction without departing from the spirit and scope of the invention as defined in the claim.

What is claimed is:—

An egg crate adapted to receive a number of egg holding boxes, said boxes being formed with back walls, front, top and bottom members and end flaps, the top and bottom walls of the egg boxes provided with a plurality of spaced openings alining with one another, said boxes adapted to be placed one upon the other, the eggs disposed between the bottom wall of one box and the top wall of the adjacent box holding the trays a spaced distance apart when placed within the egg case, the end and side members of the boxes holding the top and bottom walls of said boxes a spaced distance apart to prevent the eggs from engaging one another.

In testimony whereof I affix my signature.

JOHN EDWARD GAVIN.